(12) United States Patent
O'Malley et al.

(10) Patent No.: US 9,300,661 B1
(45) Date of Patent: Mar. 29, 2016

(54) METHOD, APPARATUS, AND COMPUTER PROGRAM PRODUCT FOR DETERMINING WHETHER TO SUSPEND AUTHENTICATION BY AN AUTHENTICATION DEVICE

(71) Applicant: EMC Corporation, Hopkinton, MA (US)

(72) Inventors: Michael O'Malley, Lowell, MA (US); Robert S. Philpott, Andover, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 14/319,213

(22) Filed: Jun. 30, 2014

(51) Int. Cl.
  *G06F 7/04* (2006.01)
  *H04L 29/06* (2006.01)
(52) U.S. Cl.
  CPC ........ *H04L 63/0838* (2013.01); *H04L 63/0861* (2013.01)
(58) Field of Classification Search
  CPC ........................ H04L 63/0838; H04L 63/0861
  USPC ............................................................ 726/7
  See application file for complete search history.

(56) References Cited

U.S. PATENT DOCUMENTS

2007/0136573 A1* 6/2007 Steinberg ...................... 713/155

* cited by examiner

*Primary Examiner* — Kambiz Zand
*Assistant Examiner* — Aubrey Wyszynski
(74) *Attorney, Agent, or Firm* — Krishnendu Gupta; Jason A. Reyes

(57) ABSTRACT

There is disclosed a technique for use in authentication. In one embodiment, the technique comprises a method with the following steps. The method comprises detecting an occurrence associated with an authentication device. The method also comprises receiving a one-time password as issued by the authentication device. The method further comprises receiving an authentication factor, wherein the authentication factor is unrelated to one-time passwords issued by the authentication device. The method still further comprises determining whether to suspend authentication by the authentication device based on the one-time password and the authentication factor.

20 Claims, 5 Drawing Sheets

METHOD, APPARATUS, AND COMPUTER PROGRAM PRODUCT FOR DETERMINING WHETHER TO SUSPEND AUTHENTICATION BY AN AUTHENTICATION DEVICE

TECHNICAL FIELD

The present invention relates generally to authentication. More specifically, the invention relates to a method, an apparatus, and a computer program product for use in determining whether to suspend authentication by an authentication device.

BACKGROUND OF THE INVENTION

Computer networks, and in particular Wide Area Networks (WANs) such as the Internet, provide opportunities for the misuse and abuse of communications traveling over the network. For example, two users (e.g., a human user and an enterprise server) communicating via the WAN may have their communications intercepted and/or altered. Also, it is possible for one user to misrepresent his, her, or its identity to another user.

Thus, there is a need for both privacy and authentication between users of the network communicating with one another. In other words, users should be able to rely on the fact that their transmissions will not be intercepted or altered, and that transmissions from someone purporting to be a particular user do in fact originate from that user.

In many secure communication applications, a seed or secret may be required in order to perform certain cryptographic operations such as encryption, decryption, authentication, etc. The secret may comprise, by way of example, a symmetric key or other secret shared by two or more entities. For example, an authentication token typically contains one or more secret values that are utilized in computing one-time password (OTP) values. A verifier or authentication server also has access to one or more secret values associated with the token. Typically, such verifiers or authentication servers have access to the same secret value or set of secret values that the token uses to generate its OTP values.

One such authentication token is the RSA SECURID authentication token commercially available from RSA, The Security Division of EMC, Bedford, Mass. The RSA SECURID authentication token can be used to provide two-factor authentication. Authorized users are issued individually-registered tokens that generate single-use authentication codes or One Time Password (OTP) values, which change based on an algorithm. For example, a time based authentication token with a 60 second interval produces different OTP values every 60 seconds. In a given two-factor authentication session, the user may be required to enter a personal identification number (PIN) plus the current OTP value from his or her authentication token. This information may be supplied to a verifier. If the OTP value determined by the verifier is valid, the user may be granted access appropriate to his or her authorization level. Thus, the OTP values are like temporary passwords that cannot be guessed by an attacker, with other than a negligible probability.

It will be known that at least some of the authentication tokens support a next code mode setting that requires the user to enter two valid authentication codes from the same token in order to authenticate to a system. Generally, the next code mode setting isn't a persistent state and is cleared once the user has successfully supplied multiple codes. The reasons for setting the token in next code mode are varied. For example, a system administrator may mark the token in next code mode in response to the user losing and then finding their token. Further, as another example, the user may have entered bad authentication codes on a number of consecutive occasions. Additionally, as a further example, the token may have fallen out of synchronization with the verifier or the authentication server due to long periods where the token hasn't been used, time server issues, etc.

For at least some authentication tokens, it is necessary for the user to enter a second valid authentication code that follows a valid authentication code for the same token within a specify validity window in order to move the token from Next Code Mode. This can be inconvenient.

SUMMARY OF THE INVENTION

There is disclosed a method, comprising: detecting an occurrence associated with an authentication device; receiving a one-time password as issued by the authentication device; receiving an authentication factor, wherein the authentication factor is unrelated to one-time passwords issued by the authentication device; and based on the one-time password and the authentication factor, determining whether to suspend authentication by the authentication device.

There is also disclosed an apparatus, comprising: at least one processing device, said at least one processing device comprising a processor coupled to a memory; wherein the apparatus is configured to: detect an occurrence associated with an authentication device; receive a one-time password as issued by the authentication device; receive an authentication factor, wherein the authentication factor is unrelated to one-time passwords issued by the authentication device; and based on the one-time password and the authentication factor, determine whether to suspend authentication by the authentication device.

There is further disclosed a computer program product having a non-transitory computer-readable medium storing instructions, the instructions, when carried out by one or more processors, causing the one or more processors to perform a method of: detecting an occurrence associated with an authentication device; receiving a one-time password as issued by the authentication device; receiving an authentication factor, wherein the authentication factor is unrelated to one-time passwords issued by the authentication device; and based on the one-time password and the authentication factor, determining whether to suspend authentication by the authentication device.

BRIEF DESCRIPTION OF THE DRAWINGS

The invention will be more clearly understood from the following description of preferred embodiments thereof, which are given by way of examples only, with reference to the accompanying drawings, in which.

DETAILED DESCRIPTION

The invention can be implemented in numerous ways, including as a process, an apparatus, a system, a computer program embodied on a computer readable storage medium, and/or a processor, such as a processor configured to execute instructions stored on and/or provided by a memory coupled to the processor. In this specification, the implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

Figure 1:
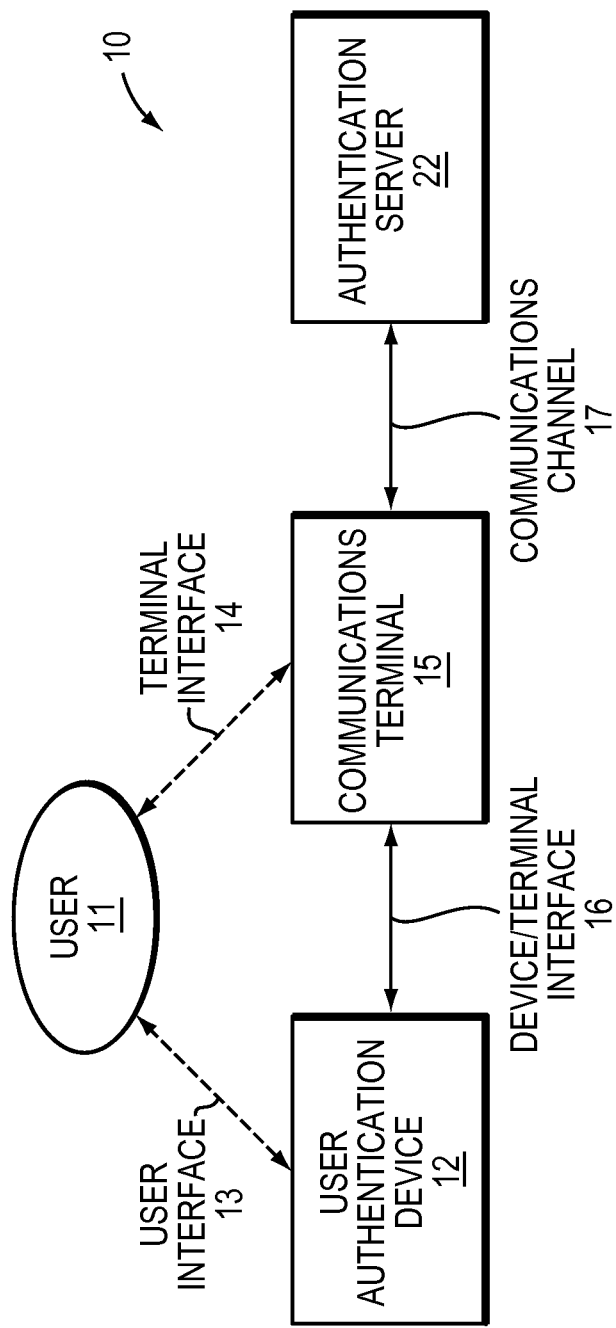
FIG. 1 is a diagram depicting an authentication system that may be used with the invention.

Referring to FIG. 1, there is illustrated an example embodiment of an authentication system 10 comprising an authentication server 22 that may be used to help securely authenticate the identity of a user 11. As used here, "authenticate" means to verify the identity of user 11, and so "authenticate" and "verify" can be used interchangeably throughout. Also, although the specification will discuss, for simplicity, authentication of "users," it should be understood that "users" means any entity requiring authentication such as, for example, a person, animal, device, machine, or computer. The inclusion of single user 11 is exemplary, and typically the server 22 can be used to verify a large number of users 11. Similarly, the inclusion of single server 22 is exemplary, and typically user 11 can have an authentication attempt verified by one or more of a large number of servers 22. In some embodiments, the single server 22 as illustrated may be able to verify user 11, while in other embodiments, two or more servers 22 may perform this task.

The server 22 can be any sort of device that implements the functions described herein. In one embodiment, the server 22 may be implemented as software running on a server class computer including a processor, memory, and so on, to enable authentication of a large number of users, for example, in an enterprise.

Authentication can result in the performance of one or more actions including, without limitation, providing access or privileges, taking action, or enabling some combination of the two. Access includes, without limitation: access to a physical location, communications network, or a computer system; access to such services as financial services and records, or health services and records; or access to levels of information or services. The user 11 and the server 22 can be physically near one another or far apart.

As illustrated, user 11 can communicate with a user authentication device 12. The user authentication device 12 may provide information used to authenticate the user 11. The user authentication device 12 can provide a user interface 13. Communication between the user 11 and the user authentication device 12 can take place via this user interface 13. The user interface 13 may provide an input interface, an output interface, or both. An input interface may enable the user 11 to communicate information to the user authentication device 12. The input interface can be any mechanism for receiving user input, and can include, without limitation: a keypad or keyboard; one or more push buttons, switches or knobs; a touch sensitive screen; a pointing or pressing device; a trackball; a device for capturing sound, voice or handwriting; a device for capturing biometric input (such as a fingerprint, retina or voice characteristic). An output interface may enable the user authentication device 12 to communicate information to the user 11 and can be any mechanism for communicating to a user, including, without limitation: a visual display to support alphanumeric characters or graphics such as a LCD display or LED display; an electrophoretic display; one or more light sources; a loudspeaker, a sound or voice generator; a vibration interface. In some embodiments, the user 11 may provide, via the user interface 13, identifying information (such as a user identifier, PIN, or password, or a biometric characteristic such as a fingerprint, retina pattern, or voice sample), or possessions (such as physical keys, digital encryption keys, digital certificates, or authentication tokens) to the user authentication device 12.

The user authentication device 12 can take various forms in various embodiments provided that the user authentication device 12 performs the functions required of the user authentication device 12 for secure authentication. The user authentication device 12 can be implemented in packages having a wide variety of shapes and form factors. For example, the user authentication device 12 can be a credit-card sized and shaped device, or can be much smaller or much larger. One credit-card sized embodiment of the user authentication device 12 includes a microprocessor with on-board memory, a power source, and a small LCD display. The embodiment optionally includes a keypad or buttons for PIN entry, entry of authentication information requests, or for other entry or interaction with the device 12. In another embodiment, a credit-card sized device 12 may include a processor with on-board memory that may be used as a "smart card," that can be installed into another device that provides power and/or an interface. In still other embodiments, a credit-card sized device 12 may be a card such as a credit card including a magnetic strip or other data store on one of its sides. In other embodiments, the user authentication device 12 may be a "key fob," that is, a smaller device with a display and battery that may be sized and shaped to fit on a key ring. In yet another embodiment, the user authentication device 12 may be a device or peripheral device combined with, and able to communicate with, a computer, telephone, or other device, such as a USB dongle or a Global Positioning System ("GPS") receiver. In still other embodiments, the user authentication device 12 can be a desktop computer, laptop computer, or personal digital assistant (PDA). For example, the authentication device 12 can be implemented as a general-purpose computer running a software program that possibly interacts with one or more other computer programs or devices on the same or a different computer or device. For example, the authentication device 12 may include a web-browser with a plug-in software component. In still further embodiments the user authentication device 12 can be a cellular telephone, or a cellular telephone with specialized embedded hardware adapted to interact with the cellular telephone's circuitry, such as a SIM card. In this example and in others, the authentication device 12 can be two components in communication with each other, for example a wireless communications device (e.g., mobile telephone) and a removable accessory, such as a SIM card. Other sizes, shapes, and implementations are possible without departing from the spirit of the invention.

Exemplary authentication devices are members of the RSA SECURID family of authentication tokens, available from RSA, The Security Division of EMC, Bedford, Mass. Some RSA SECURID hardware devices, for example, display a generated OTP value to a user, who then communicates the displayed OTP value to a computer for communication to a verifier. For example, in one embodiment, the information may be a numerical value.

In some embodiments, the user authentication device 12 stores a seed or secret that may be used to authenticate the user 11. Typically, the stored secret may be information that only is available to the authentication device 12 and the server 22. For example, in one embodiment, the information may be a numerical value. The stored secret can be used to generate an OTP value for the user 11. The user authentication device 12 can also store or access dynamic data, which, for example, can be the current time, if implemented with a running clock. The user authentication device 12 can also provide other information or perform other calculations. For example, in one embodiment, in addition to storing a secret, the device 12 may receive a personally selected secret from the user 11 (such as a PIN or password) and generate a dynamic, non-predictable OTP value in response to the secret received from the user 11, the stored secret, and the current time. Here, for example, a non-predictable OTP value may be unpredictable to anyone who does not have access to the secret received from the user 11, the stored secret, and the algorithm that generates the OTP value. The user authentication device 12 optionally can also receive other input, such as verifier identification, and use that and/or other additional information in the generation of the OTP value. The exemplary user 11 optionally (and depending on implementation) has one or both of direct access to communications terminal 15 and indirect access to the communications terminal 15 via the user authentication device 12. The communications terminal 15 can take various forms in various embodiments, including without limitation: a card reader; a device receptacle, cradle, or holder; a personal computer; a telephone; a personal digital assistant (PDA); a network interface card; a wireless transceiver. During the authentication process the user 11 can directly communicate information to only the device 12, only the terminal 15, neither the device 12 nor the terminal 15, or both the device 12 and the terminal 15. Likewise, the communications terminal 15 can receive direct input from the user 11, the user authentication device 12, or both. As shown, the user 11 optionally communicates directly with the communications terminal via the terminal user interface 14 that can be present depending on the implementation of the communications terminal 15. Like the device user interface 13, the terminal user interface 14 can include an input interface, an output interface, or both. The input and the output interfaces can take one or more of the forms described above for the device user interface 13, or other forms.

The communications terminal 15 can optionally provide a device/terminal interface 16 for communications between the terminal 15 and the user authentication device 12. In one embodiment, this interface could take the form of a wired or wireless communications channel between the terminal 15 and the device 12, using standard or proprietary protocols. For example, in an embodiment in which the device 12 is a smart card and the terminal 15 includes a card reader, the communications interface 16 could be a wired serial communications link between the smart card and the reader. In another embodiment in which the device 12 is a token that has wireless communications capability and the terminal 15 includes a wireless transceiver, the interface 16 could be a wireless link.

The communications terminal 15 can provide a user interface 13, via a terminal interface 14, without providing a device interface 16 for the device 12. For example, the terminal 15 can be a telephone that the user 11 uses to communicate authentication information to the server 22. In such an embodiment the user authentication information can be represented as tones associated with a series of alphanumeric digits. In this embodiment the user 11 may dial a telephone number to establish a communications connection with the server 22 and performs a series of key presses on the telephone to communicate the alphanumeric user authentication information to the server 22.

The terminal 15 and the authentication device 12 can each be integrated, together or separately, into another device, likewise, the functionality of the terminal 15, the device 12, and their respective interfaces 13, 14, 16 can be implemented in separable components. For example, the authentication device 12 can be implemented as an add-in card to a handheld computer (not shown) or as a plug-in software component. A handheld computer may provide the user interface 13 and also provides the terminal 15. Likewise, a mobile telephone can provide terminal 15 and user interface 13 functions, while the mobile telephone, or a plug-in component such as a SIM card, provides some or all the authentication device 12 function.

The communications terminal 15 may communicate information to the server 22 via a communications channel 17. The communications channel 17 can be any method and/or interface that enables communication of information to the server 22 that may be required to authenticate the identity of the user 11. The communications terminal 15 can communicate information generated by the user 11, the device 12, or both, to the server 22 over the communications channel 17. The communications terminal 15 and the server 22 can implement the communication channel 17 through a variety of connections including standard telephone lines, LAN or WAN links (e.g., 802.11, T1, T3, 56 kb, X.25), broadband connections (ISDN, Frame Relay, ATM), and wireless connections. Connections between the communications terminal 15 and server 22 can be established using a variety of communication protocols (e.g., TCP/IP, IPX, SPX, NetBIOS, Ethernet, RS232, and direct asynchronous connections). The server 22 may process the information received from the communications terminal 15. The server 22 can perform actions in response to authenticating the identity of the user 11. For example, the server 22 can grant on-line access to data or physical access to restricted areas or physical items.

It should be understood that the OTP values communicated over the communications channel 17 can be implemented to be dynamic and unpredictable (to an observer without knowledge of the algorithm and/or values used to generate the OTP values and/or access to previous user authentication attempts) for each user authentication attempt.

For each user authentication attempt, the server 22 may receive user authentication information, including an OTP value, and may verify the received information. In order to authenticate the user, the server 22 may perform algorithmic calculations for each user authentication attempt that is substantially identical to the algorithmic calculation performed by the user authentication device 12. The server 22 then compares the authentication information received over communications channel 17 and the authentication information generated by the server 22 to determine whether any match. If the comparison results in a match, then the server 22 can authenticate the user 11. When the received and generated user information does not match, the user authentication attempt may fail. The server 22 may communicate positive or negative acknowledgement to the communications terminal 15 via the communications channel 17, and the terminal 15 may or may not communicate the acknowledgement to the device 12 or directly to the user 11.

It should also be understood that the authentication server 22 may perform other authentication operations. For example, the authentication server 22 may perform adaptive authentication operations by accessing details of previous authentication transactions. The server 22 may perform an authentication operation based on attributes associated with the current and previous transactions. The outcome of the authentication operation may also be a factor in generating an authentication result.

Figure 2:
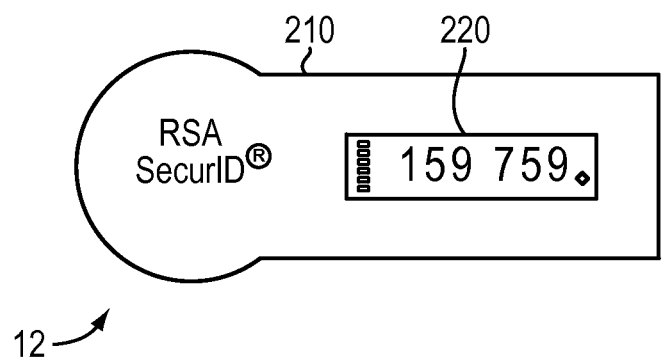
FIGS. 2 and 3 are diagrams illustrating a user authentication device within the authentication system shown in FIG. 1.

Referring to FIG. 2, there is illustrated an example embodiment of a user authentication device 12 for facilitating authentication of a user in an authentication system. In exemplary embodiments, the authentication device is a RSA SECURID authentication token commercially available from RSA, The Security Division of EMC, Bedford, Mass. It will be understood that the user authentication device 12 can generate authentication information for authenticating a user in an authentication system substantially similar to the system 10 as described with respect to FIG. 1.

In at least one embodiment, the device 12 comprises a main body 210 having a user output interface in the form of a display 220 for presenting authentication information to the user. For example, the authentication information can be a one-time password which is changeable periodically such that the password is only valid for a predetermined period of time. It will be understood from the above description that the password is a unique code known only to the authentication device 12 and the server 22 for facilitating authenticating of user 11 in the authentication system 10.

Figure 3:
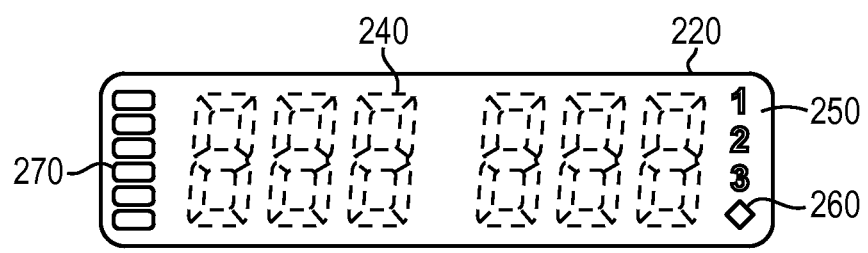

Referring to FIG. 3, there is illustrated the display 220 in a non-energized non-operational state comprising six numerals 240 that represent the authentication information. It should be understood that the device displays the numerals 240 centrally to allow a user to read clearly therefrom. The display 220 also comprises three peripheral numerals 250 and a diamond character 260 located on the right side periphery thereof. The device in an energized operational state displays the diamond character blinking at a predetermined rate to signify that the device is functioning properly. Additionally, the device displays the peripheral numeral three in response to determining the battery life of the device is to expire shortly. For example, the numeral may be visible in response to determining that the battery life is to expire in a month. Additionally, the display comprises countdown bars 270 on the left side periphery thereof. The countdown bars 270 may illustrate the time remaining before new authentication information is issued and displayed on the display. For example, a new one-time password may be issued and displayed every sixty seconds and one countdown bar may disappear every ten seconds to illustrate the time remaining before new one-time password is displayed. Moreover, the device is configured so that the numerals, countdown bars, peripheral numerals and diamond character blink simultaneously in response to detecting an error in connection with the device.

Figure 4:
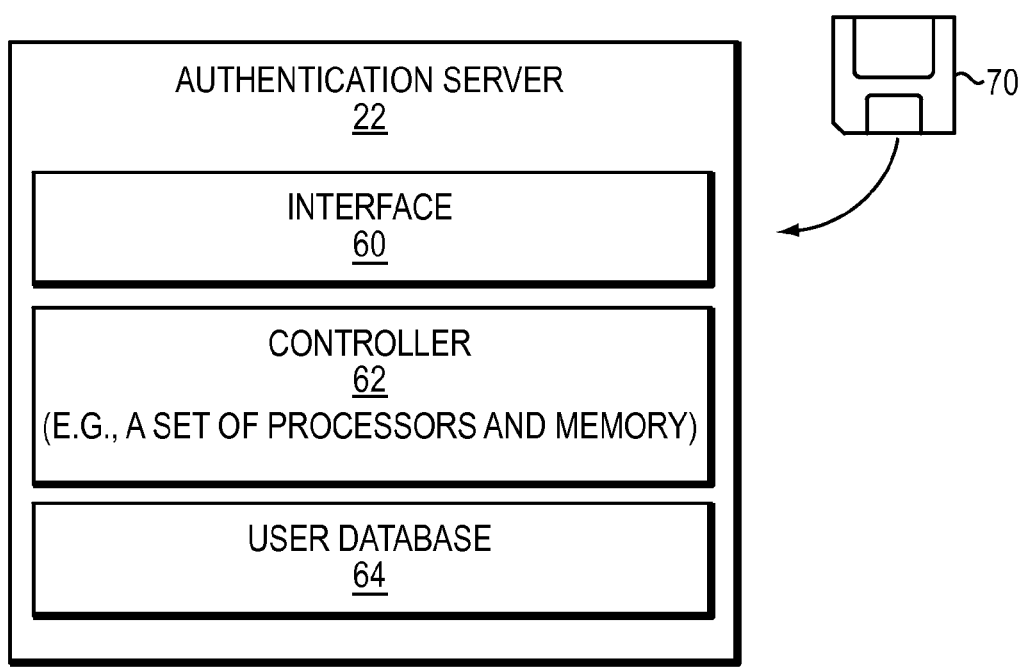
FIG. 4 is a diagram illustrating an authentication server within the authentication system shown in FIG. 1.

Referring to FIG. 4, there is illustrated certain details of the authentication server 22. The authentication server 22 includes interface 60, controller 62, and user database 64. The interface 60 enables the authentication server 22 to receive input and provide output. The user database 64 is constructed and arranged to store information describing users 11.

It should be understood that the controller 62 is constructed and arranged to perform algorithmic calculations for each user authentication attempt that are similar to the algorithmic calculation performed by the user authentication device 12. As discussed above, the controller 62 may have access to the seed for facilitating a similar calculation. As a result, the controller 62 may determine whether the received OTP matches the OTP as calculated by the controller 62.

It should also be understood that the controller 62 may be constructed and arranged to access the information in the user database 64 and perform adaptive authentication operations. During operation, the controller 62 can utilize certain operating parameters for effective risk analysis. For example, the controller 62 may generate a user attribute risk score (i.e., a result between 0 and 1000) indicating an amount of risk based on a comparison between earlier stored user attributes and currently received user attributes. In this situation, the operating parameters may include a predefined user attribute threshold so that a user attribute risk score above the user attribute threshold indicates a likely fraudster situation while a user attribute risk score below the user attribute threshold indicates an unlikely fraudster situation. In some arrangements, the user attribute risk score is an aggregation of individual weight risk analysis results from comparisons of individual attribute factors (e.g., device address, ISP address, geographic location, cookie information, etc.).

Similarly, the controller 62 may generate a user behavior risk score (i.e., a result between 0 and 1000, but which is a different score than the user attribute risk score) indicating an amount of risk based on a comparison between earlier stored user behavior information (e.g., time of day, behavioral biometrics, etc.) and recently received user behavior information. In this situation, the operating parameters may include a predefined user behavior threshold so that a user behavior risk score above the user behavior threshold indicates a likely fraudster situation while a user behavior risk score below the user behavior threshold indicates an unlikely fraudster situation. In some arrangements, the user behavior risk score is an aggregation of individual weight risk analysis results from comparisons of individual behavior factors.

In some arrangements, the controller 62 is implemented using a set of processors (e.g., processing boards, a microprocessor, etc.) and memory which stores, among other things, the seed for calculation of OTP, adaptive authentication application, etc.

It should be understood that a specialized application is capable of being delivered to and installed on the authentication server 22 from a computer program product 70 (illustrated generally by a diskette icon). Such a computer program product 70 includes a non-transitory computer readable storage medium which stores, in a non-volatile manner, instructions for performing operations. Examples of suitable computer readable storage media include CD-ROM, magnetic disk or tape cartridges, flash memory, disk memory, and the like. In addition to installing an application locally, it should be understood that such specialized software may be made available as a service via the Internet (e.g., SaaS).

Figure 5:
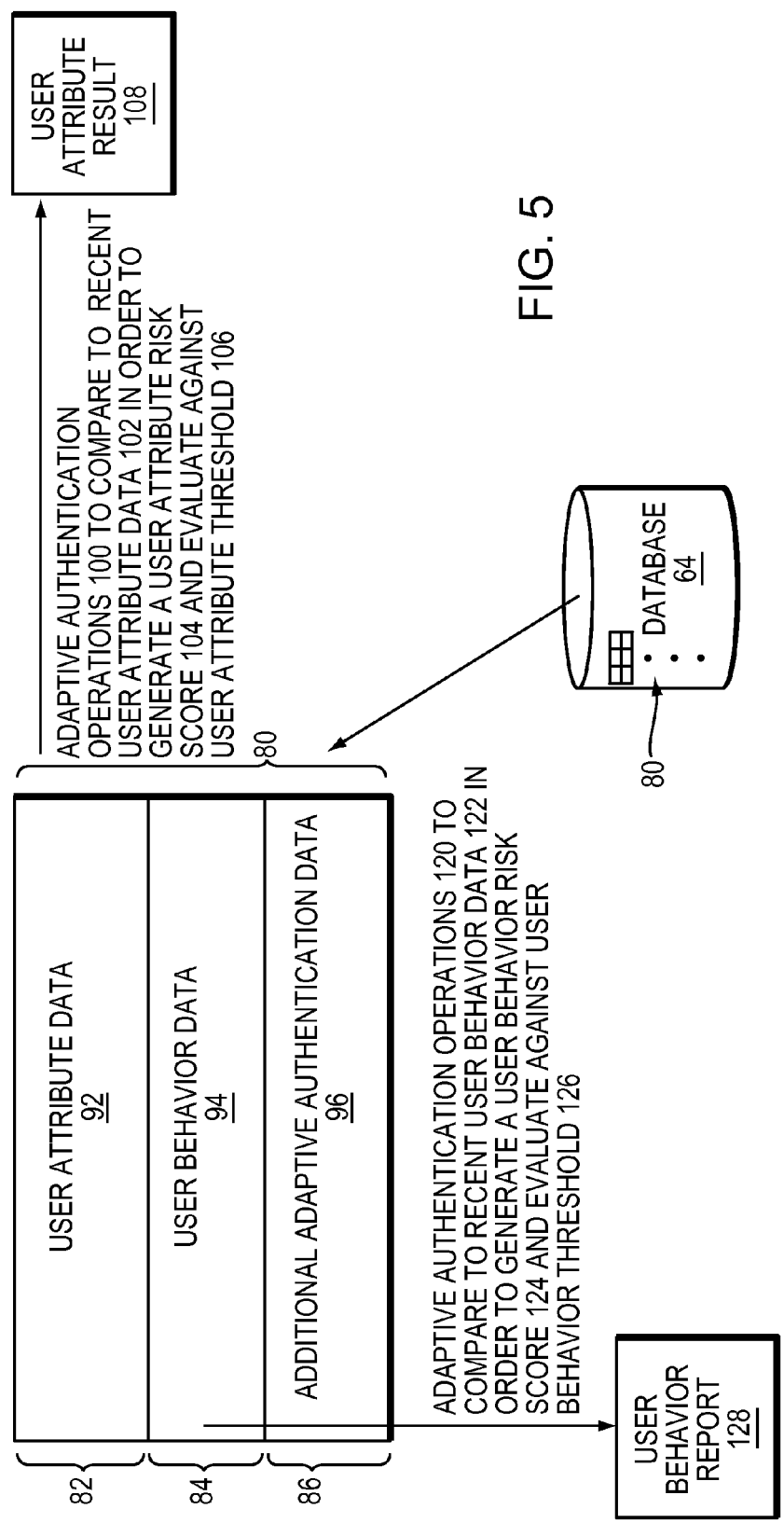
FIG. 5 is a diagram showing particular aspects of a user database and how user information stored in the user database is utilized by the authentication server of FIG. 4.

Referring to FIG. 5, there is illustrated the user database 64 and how the information stored in the user database 64 is utilized by the authentication server 22 to perform adaptive authentication operations. As shown, the user database 64 includes user entries 80 which define various features of user 11. It should be understood that the adaptive operation of the adaptive authentication server 22 is ongoing in that the user database 64 initially stores values based on initial activity of the user 11, i.e., based on initial transmissions. As transmissions continue over time (e.g., days, months, years, etc.), the user database 64 accumulates more data and thus better defines certain user attributes and behaviors of the user 11.

Each user entry 80 includes, for a user 11, a set of user attribute fields 82, a set of behavior data fields 84, and additional adaptive authentication fields 86. The user attribute fields 82 are constructed and arranged to contain user attribute data 92 of that user 11 (e.g., device address, ISP address, geographic location, cookie information, etc.). The user behavior fields 84 are constructed and arranged to contain user behavior data 94 of that user 11 (e.g., time of day, behavioral biometrics, etc.). The additional adaptive authentication fields 86 are constructed and arranged to contain additional information such as data that is appropriate for fraud intelligence (e.g., a note indicating the user has user attributes/behavior which is highly correlated to hacking), case management (e.g., history of previous hacking), and so on.

As shown, the server 22 can perform operations 100 to determine whether to approve or deny user access. Here, the controller 62 of the server 22 compares the user attribute data 92 to recent user attribute data 102 to generate a user attribute risk score 104 which is evaluated against a predefined user attribute threshold 106 (e.g., a tunable number between 0 and 1000). If the user attribute risk score 104 is lower than the user attribute threshold 106, the controller 62 gives a user attribute result 108 a first access value to grant the user 11 access. However, if the user attribute risk score 104 is higher than the user attribute threshold 106, the controller 62 gives the user attribute result 108 a second access value to deny the user 11 access.

Similarly, the server 22 performs operations 120 to determine whether to flag possible fraudster situations. In this situation, the controller 62 of the server 22 compares the user behavior data 94 to recent user behavior data 122 to generate a user behavior risk score 124 which is evaluated against a predefined user behavior threshold 126 (e.g., a tunable number between 0 and 1000). If the user behavior risk score 124 is lower than the user behavior threshold 126, the controller 62 gives a user behavior report 128 a first behavior value indicating that a possible fraudster situation is unlikely. However, if the user behavior risk score 124 is higher than the user behavior threshold 126, the controller 62 gives the user behavior report 128 a second behavior value indicating that a possible fraudster situation is likely.

Likewise, it should be understood that additional evaluations can be made to the data that is received. Along these lines, intermediate risk results may be weighted and combined with other intermediate risk results to determine an overall risk score on a sliding continuous scale (e.g., between 0 and 1000). The particular position along the sliding continuous scale provides an indication of the risk associated with user 11, i.e., the likelihood that a fraudster has compromised the user's account.

Figure 6:
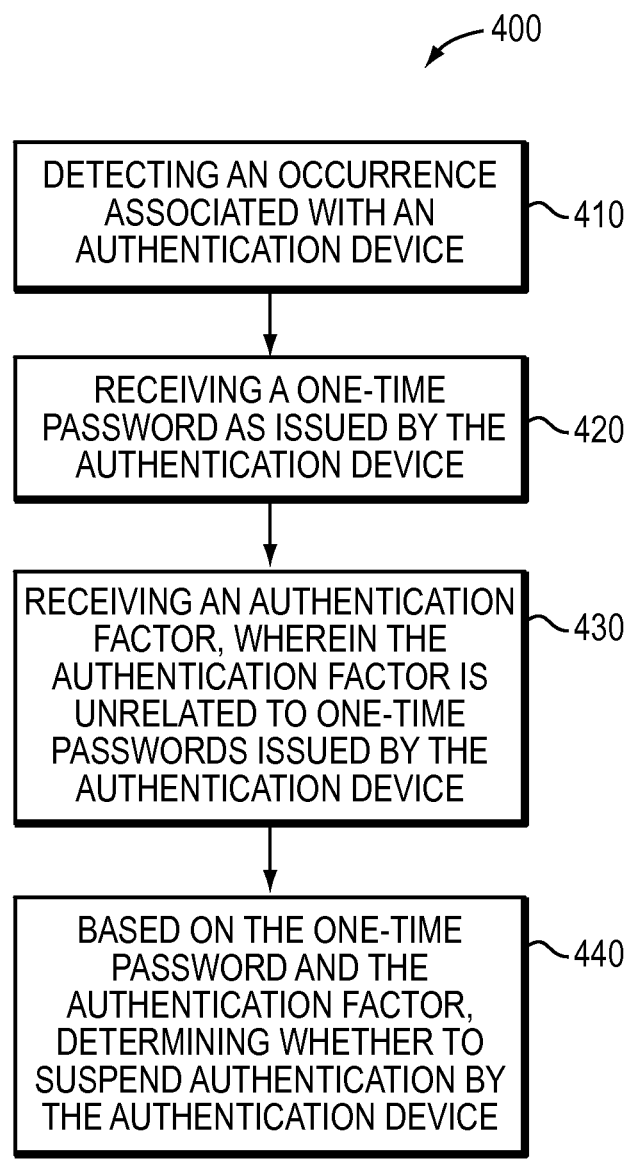
FIG. 6 is a flow chart illustrating a method of carrying out the technique within the authentication system shown in FIG. 1.

Referring to FIG. 6, there is illustrated a flow chart illustrating a method 400 of carrying out the technique within the authentication system shown in FIG. 1. In the flow diagram, the operations are summarized in individual blocks. The operations may be performed in hardware, or as processor-executable instructions that may be executed by a processor. Furthermore, the method 400 may, but need not necessarily, be implemented in the system of FIG. 1.

At step 410, the method comprises detecting an occurrence associated with an authentication device. In this embodiment, the detected occurrence may result in the user authentication device being entered into a next code mode. For example, the occurrence may be associated with the authentication device falling out of synchronization with a server. Also, the occurrence may be associated with an incorrect entry of one-time passwords purportedly issued by the authentication device. For example, the one-time passwords may have been entered incorrectly a predetermined number of times. Further, the occurrence may be associated with a system administrator entry. In response to detecting the occurrence, a request may be issued to enter authentication information in order to determine the significance of the occurrence.

At step 420, the method comprises receiving a one-time password as issued by the authentication device. It should be understood that the one-time password may be the authentication information presented on the display of the authentication device (e.g., RSA SECURID authentication token). If the authentication device is a time-based authentication device then the user should attempt to transmit the password before the time associated therewith expires.

At step 430, the method comprises receiving an authentication factor, wherein the authentication factor is unrelated to one-time passwords issued by the authentication device. The authentication factor may relate to user attribute data. For example, device address, ISP address, geographic location, and cookie information. Also, the authentication factor may relate to user behaviour data. For example, time of day, behavioral biometrics, etc. Further, the authentication factor may even relate to user biometric data. For example, fingerprint, retina, and voice data.

At step 440, the method comprises determining whether to suspend authentication by the authentication device based on the one-time password and the authentication factor. In this embodiment, the server 22 may perform an algorithmic calculation similar to the algorithmic calculation performed by the user authentication device 12 in order to determine whether the received one-time password is correct. Further, the server 22 may perform an adaptive authentication operation based on the received authentication factor and previous transactions in the user database. If the one-time password matches and the authentication factor exhibits a low degree of risk (i.e., risk score below threshold) then the server may decide not to suspend authentication by the authentication device. On the other hand, if the one-time password does not match and/or the authentication factor exhibits a high degree of risk (i.e., risk score above threshold) then the occurrence may ultimately result in suspension of authentication by the authentication device. In fact, the suspension may not be revoked until further authentication and/or further actions to revoke the suspension. The authentication device may be disabled until further authentication and/or further actions to revoke the suspension.

It should also be understood that the method described herein may also use a windowing technique in order to allow for minor synchronization errors. For example, in an embodiment in which minutes are used, an inner window, of, for example, one minute is provided, while an outer window of, for example, ten minutes is provided. If the one-time passwords do not match then server recalculates one-time password for every value within the inner window, in this case for one minute before and one minute after the original minute value. If the one-time passwords match within that inner window, then the code is valid, but a clock correction factor may be stored in association with the user authentication device 12. Otherwise, server 22 recalculates one-time password for every value within the outer window, in this case for ten minutes before and ten minutes after the original minute value. If one-time password matches within that outer window, then the code is valid, but a correction factor must also be applied, as above.

In some embodiments, when the calculations are done in dedicated hardware, an inner window of one minute is used, and an outer window of ten minutes is used. In other embodiments, when the calculations are done in software, an inner window of ten minutes is used, and an outer window of seventy minutes is used.

Advantageously, the techniques described herein provide ease of use for the user as well as providing confidence to the authentication system. It also provides a means for automatically synchronizing a token that has fallen from a small window but remains in a larger valid window.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method, comprising executing, on at least one processor, the steps of:
   detecting an occurrence in connection with an authentication device, wherein the authentication device is adapted to generate one-time passwords;
   receiving a one-time password generated by the authentication device;
   receiving an authentication factor, wherein the authentication factor is unrelated to one-time passwords generated by the authentication device; and
   based on the one-time password and the authentication factor, determining the significance of the occurrence;
   wherein determining the significance of the occurrence, comprises:
   generating a second one-time password;
   performing a first operation to determine if the second one-time password matches the one-time password generated by the authentication device;
   performing a second operation involving the authentication factor and a previous transaction to determine the similarity between the authentication factor and a factor associated with the previous transaction; and
   based on the first and second operations, deciding whether or not to suspend authentication involving one-time passwords generated by the authentication device.

2. The method as claimed in claim 1, wherein the authentication factor relates to user attribute data selected from the group consisting of: device address, ISP address, geographic location, and cookie information.

3. The method as claimed in claim 1, wherein the authentication factor relates to user behaviour data selected from the group consisting of: time of day, and behavioral biometrics.

4. The method as claimed in claim 1, wherein the authentication factor relates to user biometric data selected from the group consisting of: fingerprint, retina, and voice.

5. The method as claimed in claim 1, wherein the occurrence is associated with an incorrect entry of one-time passwords purportedly issued by the authentication device.

6. The method as claimed in claim 1, wherein the occurrence is associated with the authentication device falling out of synchronization with a server.

7. The method as claimed in claim 1, wherein the authentication device comprises one of a time-based authentication device and an event-based authentication device.

8. An apparatus, comprising:
   at least one processing device, said at least one processing device comprising a processor coupled to a memory;
   wherein the apparatus is configured to:
   detect an occurrence in connection with an authentication device, wherein the authentication device is adapted to generate one-time passwords;
   receive a one-time password generated by the authentication device;
   receive an authentication factor, wherein the authentication factor is unrelated to one-time passwords generated by the authentication device; and
   based on the one-time password and the authentication factor, determine the significance of the occurrence;
   wherein determining the significance of the occurrence, comprises:
   generating a second one-time password;
   performing a first operation to determine if the second one-time password matches the one-time password generated by the authentication device;
   performing a second operation involving the authentication factor and a previous transaction to determine the similarity between the authentication factor and a factor associated with the previous transaction; and
   based on the first and second operations, deciding whether or not to suspend authentication involving one-time passwords generated by the authentication device.

9. The apparatus as claimed in claim 8, wherein the authentication factor relates to user attribute data selected from the group consisting of: device address, ISP address, geographic location, and cookie information.

10. The apparatus as claimed in claim 8, wherein the authentication factor relates to user behaviour data selected from the group consisting of: time of day, and behavioral biometrics.

11. The apparatus as claimed in claim 8, wherein the authentication factor relates to user biometric data selected from the group consisting of: fingerprint, retina, and voice.

12. The apparatus as claimed in claim 8, wherein the occurrence is associated with an incorrect entry of one-time passwords purportedly issued by the authentication device.

13. The apparatus as claimed in claim 8, wherein the occurrence is associated with the authentication device falling out of synchronization with a server.

14. The apparatus as claimed in claim 8, wherein the authentication device comprises one of a time-based authentication device and an event-based authentication device.

15. A computer program product having a non-transitory computer-readable medium storing instructions, the instructions, when carried out by one or more processors, causing the one or more processors to perform a method of:
   detecting an occurrence in connection with an authentication device, wherein the authentication device is adapted to generate one-time passwords;
   receiving a one-time password generated by the authentication device;
   receiving an authentication factor, wherein the authentication factor is unrelated to one-time passwords generated by the authentication device; and
   based on the one-time password and the authentication factor, determining the significance of the occurrence;
   wherein determining the significance of the occurrence, comprises:
   generating a second one-time password;
   performing a first operation to determine if the second one-time password matches the one-time password generated by the authentication device;
   performing a second operation involving the authentication factor and a previous transaction to determine the similarity between the authentication factor and a factor associated with the previous transaction; and
   based on the first and second operations, deciding whether or not to suspend authentication involving one-time passwords generated by the authentication device.

16. The computer program product as claimed in claim 15, wherein the authentication factor relates to user attribute data selected from the group consisting of: device address, ISP address, geographic location, and cookie information.

17. The computer program product as claimed in claim 15, wherein the authentication factor relates to user behaviour data selected from the group consisting of: time of day, and behavioral biometrics.

18. The computer program product as claimed in claim 15, wherein the authentication factor relates to user biometric data selected from the group consisting of: fingerprint, retina, and voice.

19. The computer program product as claimed in claim 15, wherein the occurrence is associated with an incorrect entry of one-time passwords purportedly issued by the authentication device.

20. The computer program product as claimed in claim 15, wherein the occurrence is associated with the authentication device falling out of synchronization with a server.

* * * * *